US 6,629,581 B2
(12) United States Patent
Lambiaso

(10) Patent No.: US 6,629,581 B2
(45) Date of Patent: Oct. 7, 2003

(54) MAINTENANCE CART FOR AIRCRAFT VEHICLE

(75) Inventor: Guy A. Lambiaso, Garden Grove, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 09/942,195

(22) Filed: Aug. 29, 2001

(65) Prior Publication Data

US 2003/0042073 A1 Mar. 6, 2003

(51) Int. Cl.[7] .............................. E04C 1/00; E04G 3/16
(52) U.S. Cl. ...................................... 182/63.1; 182/223
(58) Field of Search ................... 182/152, 36, 12–17, 182/63.1, 223; 280/47.35; 51/165.71; 244/137.1

(56) References Cited

U.S. PATENT DOCUMENTS

| | | | |
|---|---|---|---|
| 3,434,566 A | * | 3/1969 | Miller |
| 4,658,924 A | | 4/1987 | Dobbie |
| 5,138,800 A | | 8/1992 | Janusz |
| 5,465,988 A | * | 11/1995 | Dennis |
| 5,655,734 A | | 8/1997 | Dahl |
| 5,868,544 A | | 2/1999 | Cox |
| 5,876,047 A | * | 3/1999 | Dennis |
| 5,904,165 A | | 5/1999 | McLean et al. |
| 6,195,943 B1 | * | 3/2001 | Woods |
| 6,264,219 B1 | | 7/2001 | Smith |

* cited by examiner

Primary Examiner—Alvin Chin-Shue
(74) Attorney, Agent, or Firm—Harness Dickey & Pierce P.L.C.

(57) ABSTRACT

A maintenance cart for use in an aircraft interior is disclosed. The maintenance cart has a pair of maintenance platforms which are capable of being disposed within the maintenance cart. A linear track mechanism is coupled to the maintenance platform which allows for the deployment of the maintenance platforms within an aircraft. A pair of deployable steps are provided which allow maintenance personnel to move through the maintenance cart to the fore or aft of an aircraft.

12 Claims, 6 Drawing Sheets

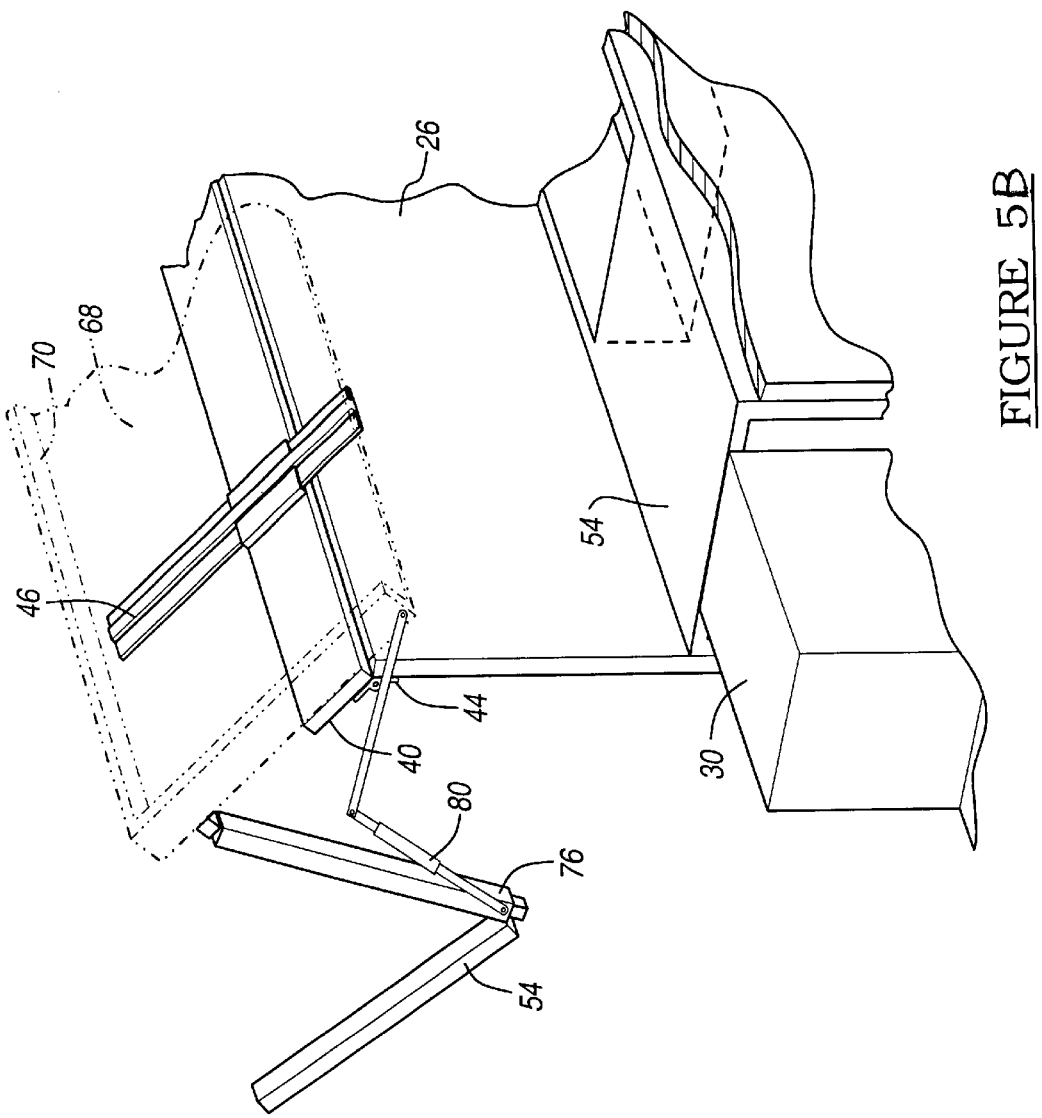

MAINTENANCE CART FOR AIRCRAFT VEHICLE

FIELD OF THE INVENTION

The present invention generally relates to an aircraft maintenance cart and, more particularly, to a maintenance cart having a collapsible maintenance platform with a linear track mechanism.

BACKGROUND OF THE INVENTION

With ever increasing demands from airline customers, flexibility and adaptivity of aircraft interiors is increasingly required in order to provide an aircraft that meets broader customer needs. Increases in the number of customers serviced and time spent within an aircraft have led customers to consistently request electronic devices within an aircraft compartment which allow for activities such as work or play. As such, aircraft manufacturers are constantly updating the interiors of aircraft passenger compartments with new electronic assemblies. Frequently, these electronic assemblies are provided within the ceiling or immediately below the overhead storage compartment of the aircraft. To effectively gain access to these areas without damaging the aircraft interior, aircraft manufacturers must remove the seats from the passenger compartments in order to gain access to the modified areas.

The present invention provides a maintenance cart with storable and foldable work surfaces to facilitate convenient surfaces for use by maintenance personnel within the aircraft passenger compartment. The maintenance cart of the present invention provides a pair of platforms folded and enclosed within the center of the maintenance cart. The maintenance cart is transportable within the aisle between the passenger seats. In addition, the foldable work surfaces or maintenance platforms, which can be disposed over passenger seats, include a linear track mechanism for positioning or retracting the work surfaces. Additionally, the maintenance cart can include stairs which allow maintenance personnel to pass over and through the maintenance cart during repair of the aircraft interior.

SUMMARY OF THE INVENTION

Accordingly, this invention provides a foldable maintenance platform for a maintenance cart that overcomes the problems and disadvantages of the maintenance practices of the prior art. Briefly, the invention includes a maintenance cart for use in an aircraft interior, a maintenance platform capable of being disposed within the maintenance cart, and a linear track mechanism coupled to the maintenance platform. The linear track mechanism allows the maintenance platform to be moved from a stored position within the maintenance cart to a horizontal position over the passenger seats. Upon leaving the maintenance cart, collapsible legs unfold and can be positioned beneath the maintenance platform to allow for support. Thus, the linear track mechanism allows the use of a maintenance platform which substantially reduces the possibility of damage to the aircraft's passenger seats.

Further disclosed is a maintenance cart for an aircraft which can be disposed within the aisle between the passenger seats. The maintenance cart defines an interior cavity. A foldable maintenance platform is coupled to a linear track mechanism which is capable of being slidably received within the central cavity. The linear track mechanism functions to allow the foldable maintenance platform to be moved from inside the maintenance cart to a position outside of the maintenance cart.

Further disclosed is a maintenance cart which includes a pair of foldable maintenance platforms. The maintenance cart defines an interior cavity which contains a step to allow maintenance workers a safe means by which to gain access to the maintenance platforms or pass through the maintenance cart to the fore and aft of the aircraft.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The various advantages of the present invention will become apparent to one skilled in the art upon reading the following specification and by reference to the drawings in which:

FIGS. 5a and 5b show a partial cross-section of the maintenance cart showing the work surface in a partially deployed state.

DETAILED DESCRIPTION OF THE PREFERRED EMBODIMENTS

The following description of the preferred embodiment(s) is merely exemplary in nature and is in no way intended to limit the invention, its application, or uses.

Figure 1:
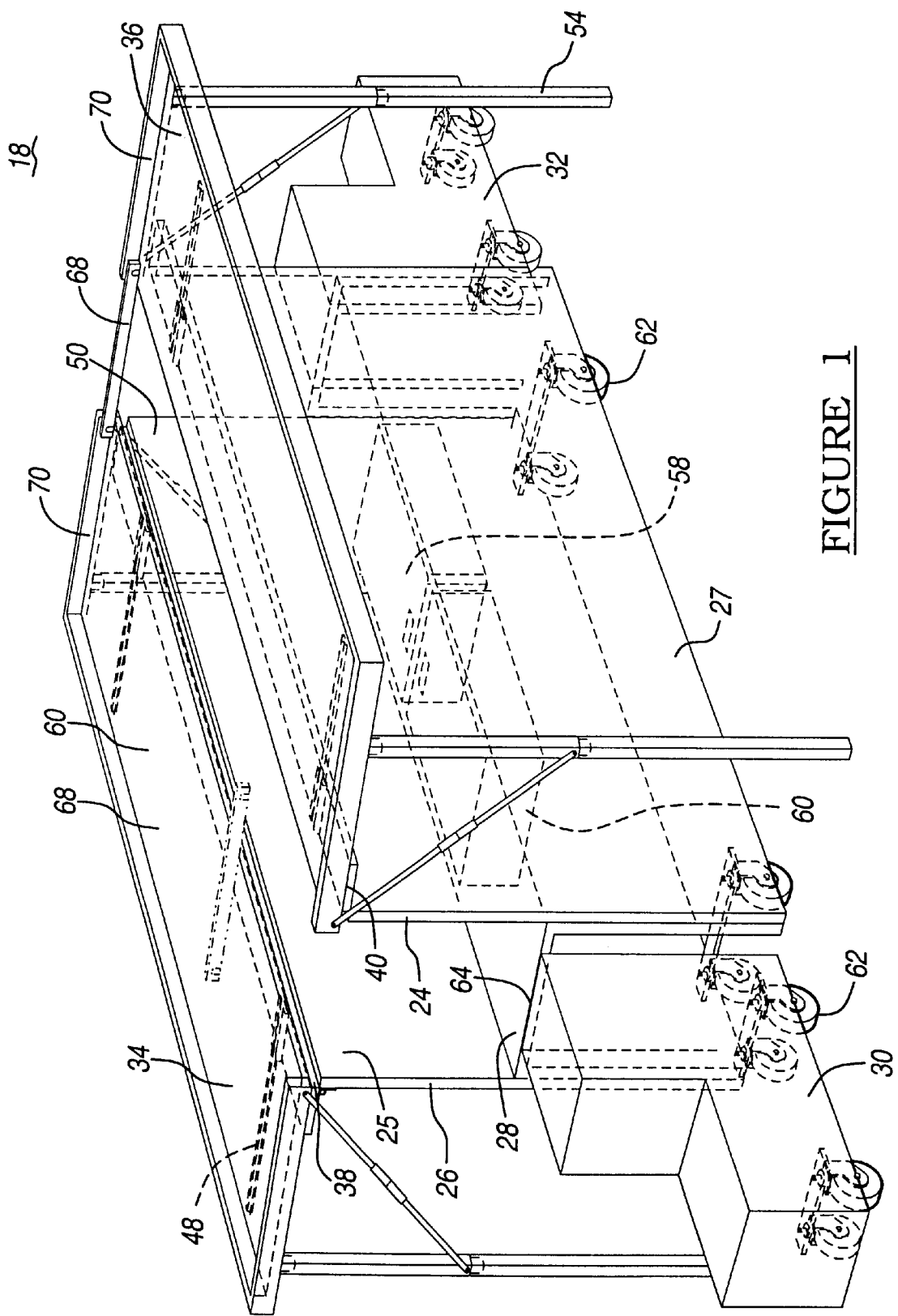
FIG. 1 is a perspective view of the work cart of the present invention having the work surfaces in their deployed state.

Referring to FIG. 1, there is shown a perspective view of the maintenance cart assembly 18 of the present invention. The maintenance cart assembly 18 is generally formed of a body 22 having a first depending sidewall 24 and second depending sidewall 26. The body 22 further has a walking platform 28 and first and second steps 30 and 32.

Coupled to the first and second sidewall are first and second maintenance platforms 34 and 36. First and second maintenance platforms 34 and 36 are shown in their deployed positions. The first and second sidewalls 24 and 26 act as load bearing members for the maintenance platforms 34 and 36. They allow maintenance personnel to lay on the maintenance platforms 34 and 36 to gain access to the overhead panels to be modified. As such, the maintenance platforms 34 and 36 preferably can support more than 250 pounds.

The first and second maintenance platforms 34 and 36 are coupled to the first and second sidewalls 24 and 26 through a first and second hinge coupling members 38 and 40 and a first and second hinges 42 and 44. Additionally, the first and second maintenance platforms 34 and 36 are coupled to the first and second hinge coupling members 38 and 40 by a linear track mechanisms 46 and 48. The linear track mechanisms 46 and 48, which are preferably U-channel supports, allow the first and second maintenance platforms 34 and 36 to be stored vertically within an interior cavity 50 of the body 22. The maintenance platforms 34 and 36 can be alternatively stored vertically adjacent to the first and second depending sidewall exterior surfaces 25 and 27.

Disposed on the lower surface 52 of the first and second maintenance platforms 34 and 36 are two pair of depending legs 54. The depending legs 54, which are shown in their extending position, add support to the first and second maintenance platforms 34 and 36 to allow maintenance personnel to sit or lie on the first and second maintenance platforms 34 and 36.

Shown in their deployed state are first and second steps 30 and 32. The first and second steps which can be stored within the interior cavity 50 of the body 22 allow maintenance personnel to pass up and over the maintenance cart walking surface 54 to gain access to the fore or aft of the aircraft 16. As such, the steps 30 and 32 and platform 28 must be able to support weights greater than 250 pounds. Further shown is optional stabilizing bar 65 which spans cavity 50 to add stability to the structure. Disposed on the walking surface 54 is an optional pair of lids 56 and 58 which allow access to a storage compartment 60 disposed beneath the walkway 54 and within the body 22.

Figure 2:
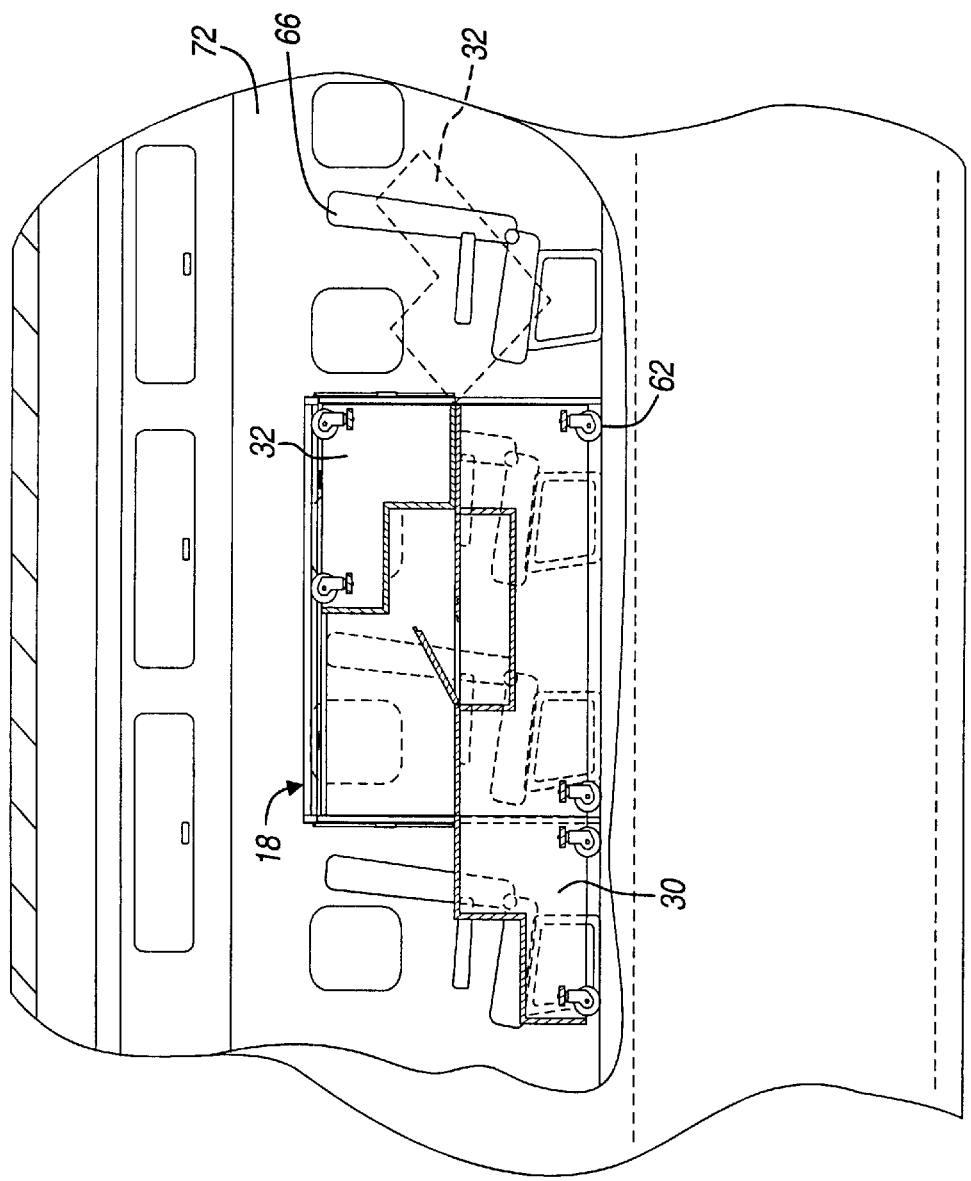
FIG. 2 is a side view of the maintenance cart placed within an aircraft's passenger compartment.

FIG. 2 discloses the components of the maintenance cart 18 within an aircraft passenger compartment. The maintenance cart 18 has a number of portions which are shown in their partially deployed condition. The maintenance cart 18 has a plurality of locking wheels 62 which allow for transportation of the maintenance cart within the interior of the aircraft passenger compartment 72.

Shown is the first step 30 in its deployed position. The second step 32 is shown in its stored position. As seen by the phantom line, the second step 32 can be rotated about a hinge 64 disposed between the walking surface 54 of the body 22 and the second step 32. This defines a passageway through the interior cavity 50 of maintenance cart 18.

Figure 3:
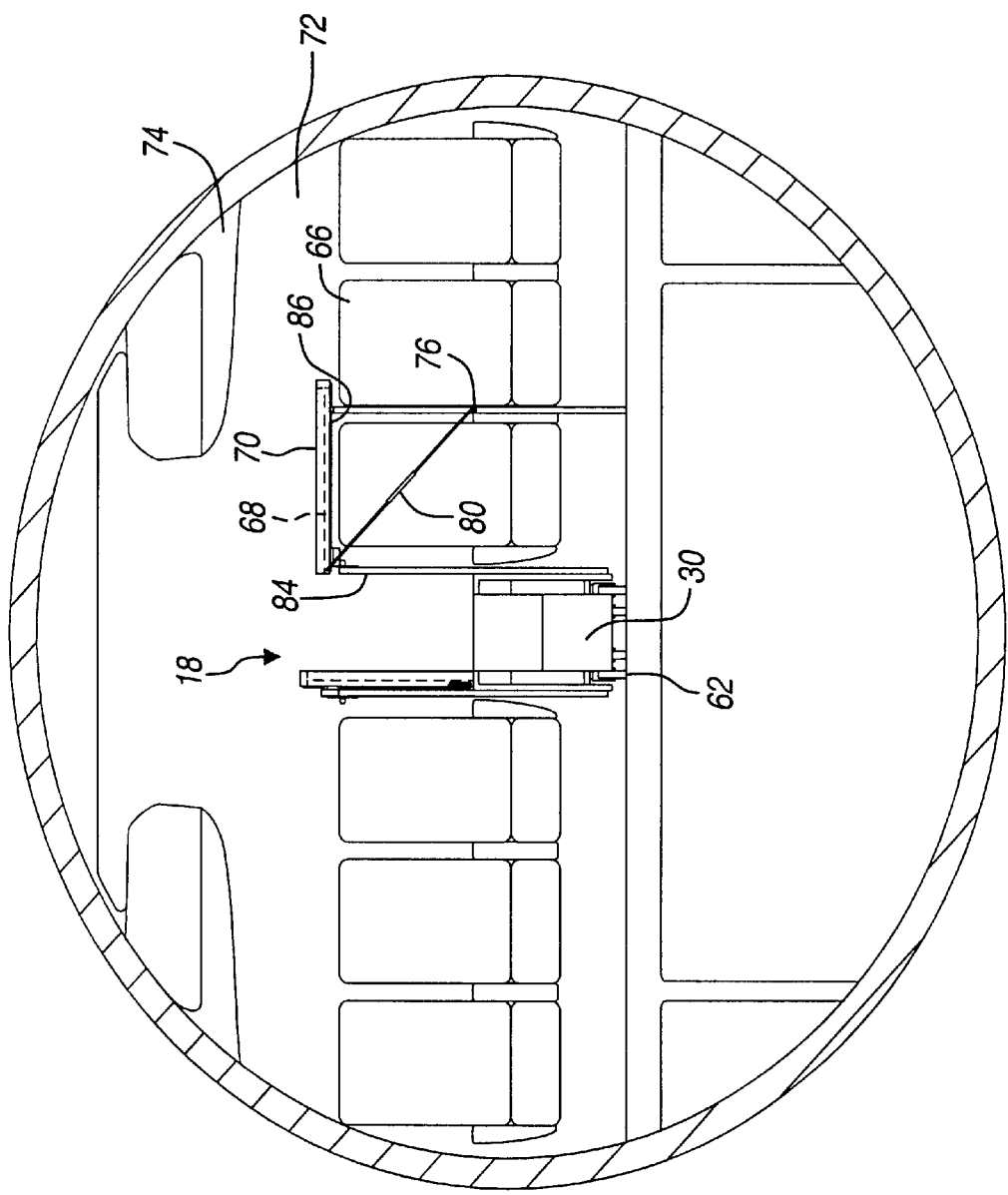
FIG. 3 is a cross-section of an aircraft's passenger compartment with the maintenance cart of the present invention disclosed between the passenger seats.

FIG. 3 shows a cross-section of a typical passenger compartment with the first maintenance platform 18 in its deployed position. Additionally, the first and second steps 30 and 32 have been deployed. As can be seen, the first maintenance platform is disposed over an aircraft seat 66. The first maintenance platform 34 has an upper surface 68 having a peripheral flange 70 to prevent tools or fasteners from slipping off of the first maintenance platform on to the floor of the passenger compartment 72. As can be seen, the second maintenance platform 34 allows for easy access to the undersurface of the overhead storage compartments 74. It is envisioned that maintenance personnel would either sit or lie on the upper surface 68 of the first maintenance platform 34. The legs 54 are shown in their fully extended position. Disposed between a medial portion 76 of the legs 54 and the interior peripheral edge 78 of the first maintenance platform 34 is a strut member 80. The first maintenance platform 34 is supported on its interior peripheral side 80 by the first sidewall through the locking wheel 62 and at its exterior peripheral side 82 by the leg members 54.

Figure 4:
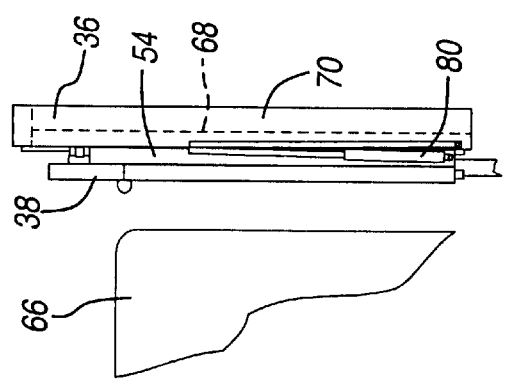
FIG. 4 is a close up of the work surface of the present invention in its stored position.

FIG. 4 depicts the second platform 36 in its stored position. In its stored position, the second maintenance platform 36 is positioned adjacent to the interior wall 84 of the second sidewall 26. As can be seen, the supporting legs 54 and struts 80 are disposed between the lower surface 86 of the second maintenance platform 36 and the interior wall 84 of the second sidewall 26. Also shown is the second hinge coupling member 40 which is coupled to the second maintenance platform 36 by the linear track mechanism 46. The maintenance cart 18 is configured so the exterior surface 27 of the depending sidewall 26 does not contact the seats 66 when the maintenance cart 18 is being transported down the aisle of the aircraft 16.

Figure 5A:
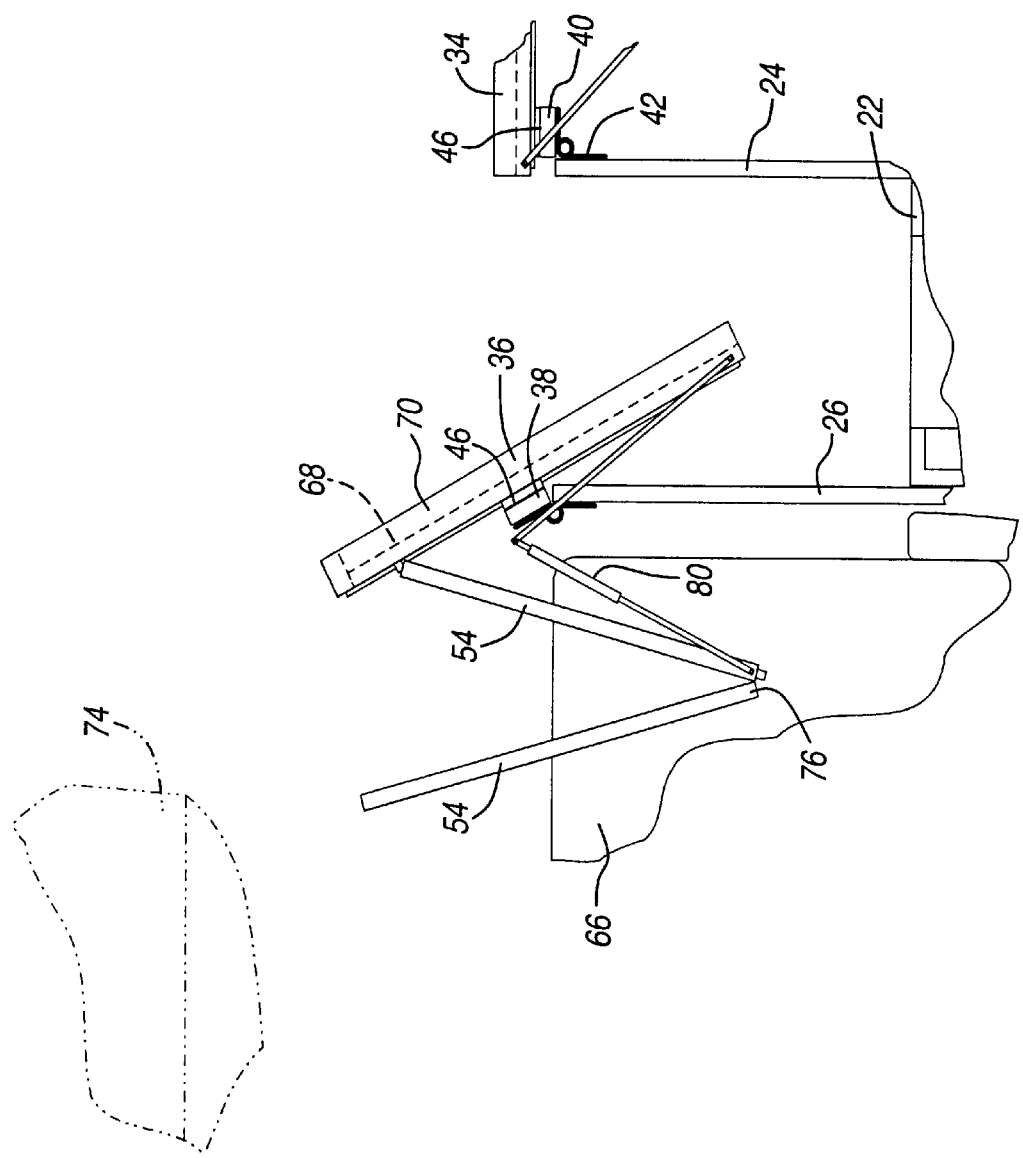

FIG. 5 depicts the second maintenance platform 36 in its partially deployed position. As can be seen, the second hinge coupling member 40 is rotated about second hinge 44. While this rotation occurs, the second maintenance platform 36 is slid up out of the cavity 50 within the body 22 of the maintenance cart 18. Additionally, shown is the unfolding of support legs 54. It is envisioned that the support legs 54 can either be folding or have telescopic properties to allow for the proper positioning within the passenger compartment 72.

Figure 6:
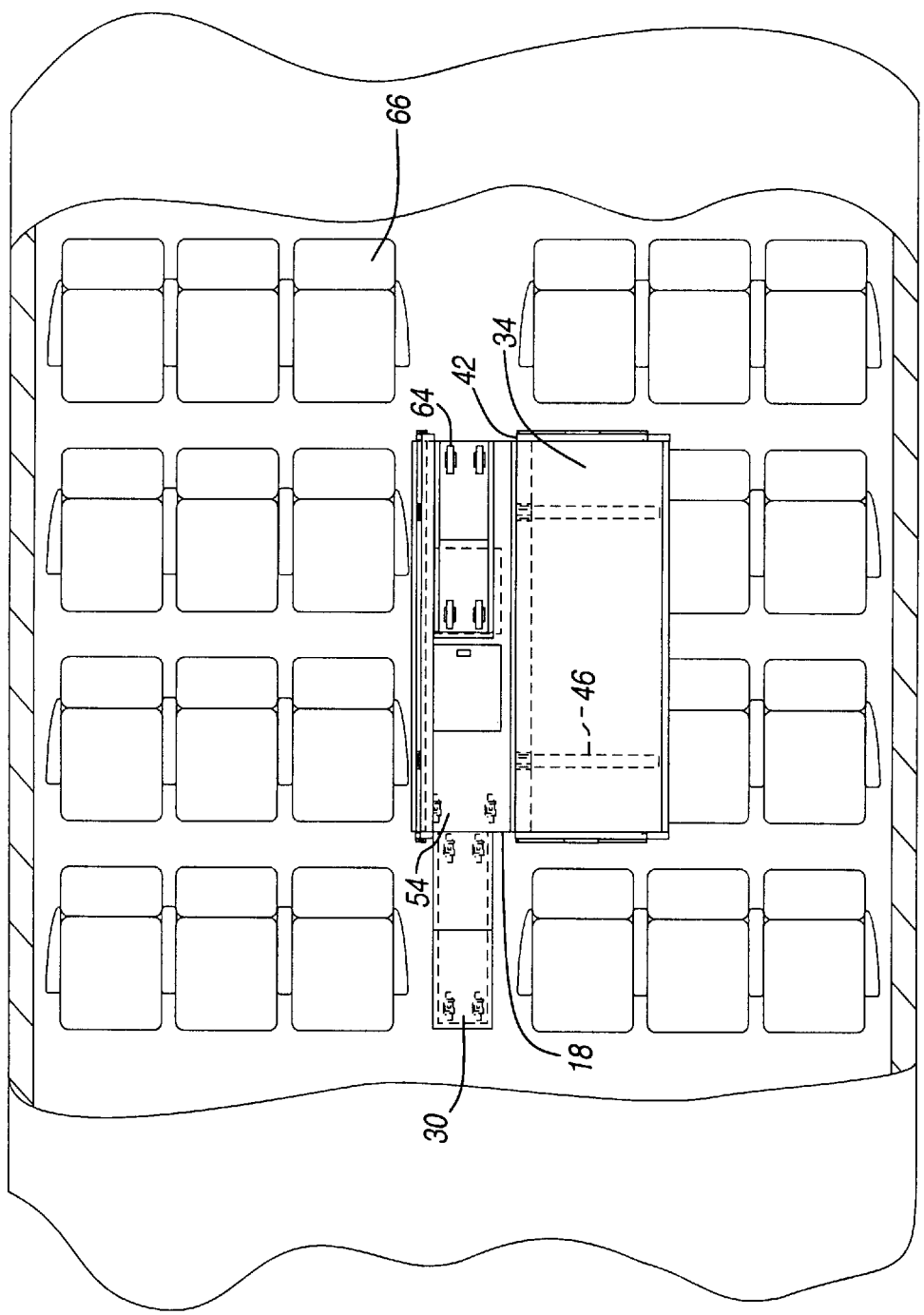
FIG. 6 is a top view of the maintenance cart of the present invention with one of the work surfaces deployed.

FIG. 6 is a top view of the aircraft passenger compartment 72 having the maintenance cart 18 of the present invention disposed within the aisle 88. As can be seen, the second maintenance platform 36 is in its deployed state over the passenger seat 66. Also shown is the first maintenance platform 34 in its stored position. During operation, the maintenance personnel will position the maintenance cart 18 in its proper location within the aircraft passenger compartment 72. The personnel will first rotate the first and second steps 30 and 32 from their stored positions to their deployed positions. This allows the aircraft positions to move from the fore to the aft of the aircraft 16. The maintenance personnel will then deploy the first maintenance platform 34 by lifting the first maintenance platform 34 out of its stowed position and rotating the hinge coupling member 40 about hinge 44. At this time, the support legs 54 are deployed and adjusted to the proper height to support the first maintenance platform 34. The optional strut members 80 are then positioned to provide proper support.

As can be seen in FIG. 6, the benefits of having a maintenance cart 18 which allows maintenance personnel to be able to move fore and aft through an aircraft without disturbing the work of maintenance personnel who are working on the first or second maintenance platforms 34 or 36 is a significant improvement. Typically, the installation of electronic components within the undersurface of the overhead storage compartment 74 is labor and time intensive. As such, the development of a maintenance cart 18 for use within an aircraft passenger compartment 72 that allows the free movement of maintenance personnel within the passenger compartment 72 represents a significant development in aircraft maintenance which will reduce costs and the time for retrofitting aircraft interiors.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A maintenance cart for use in the passenger compartment of a mobile platform, said maintenance cart comprising:
   a base having a pair of depending sidewalls;
   a walkway disposed between the sidewalls;
   a first maintenance platform capable of being disposed in a first position substantially parallel to said depending sidewalls and above the walkway;
   stairs hingeably coupled to said base, said stairs being capable of being rotated from a first position between the depending sidewalls to a second position; and
   a linear track mechanism coupled to said first maintenance platform, whereby said linear track mechanism is capable of moving said first maintenance platform from said first position to a second position substantially perpendicular to said depending sidewalls and above said walkway.

2. The maintenance cart of claim 1 wherein said linear track mechanism comprises a U-channel support member, said U-channel supporting at least a portion of said first maintenance platform.

3. The maintenance cart of claim 2 wherein said walkway is capable of supporting a weight greater than about 250 pounds.

4. The maintenance cart of claim 1 wherein said first maintenance platform comprises an extendable leg coupled to a surface of said first maintenance platform.

5. The maintenance cart of claim 1 wherein said first maintenance platform is coupled to one of said depending sidewalls by a hinge.

6. The maintenance cart of claim 1 further comprising a second maintenance platform capable of being disposed between said depending sidewalls.

7. A maintenance cart for use on a mobile platform, comprising:
   a base portion defining a walkway;
   first and second sidewalls coupled to said base portion extending upwardly above the walkway;
   a central cavity defined by said base and sidewalls; and
   a maintenance platform coupled to the top of at least one of said first and second sidewalls and coupled to a linear track mechanism which is which enables said maintenance platform to be slidably received within said central cavity, said maintenance platform configured to move from a first position within said central cavity to a second position above and parallel to the walkway.

8. The maintenance cart of claim 7 wherein said linear track mechanism is disposed within said central cavity.

9. The maintenance cart of claim 7 wherein said linear track mechanism is coupled to said first sidewall by a hinge.

10. The maintenance cart of claim 7 wherein the linear track member further comprises a U-channel member, said U-channel member supporting said maintenance platform.

11. The maintenance cart of claim 7 further comprising a pair of stairs hingeably coupled to the base portion, wherein said stairs are capable of rotation from a first position between said first and second sidewalls to a second position adjacent said base.

12. The maintenance cart of claim 11 wherein the base defines a storage cavity and comprises at least one lid covering said cavity, said lid defining a portion of said walkway.

* * * * *